(12) United States Patent
Clawson et al.

(10) Patent No.: US 6,916,564 B2
(45) Date of Patent: *Jul. 12, 2005

(54) HIGH-EFFICIENCY FUEL CELL POWER SYSTEM WITH POWER GENERATING EXPANDER

(75) Inventors: Lawrence G. Clawson, Dover, MA (US); Christopher J. O'Brien, Watertown, MA (US); Mark R. Hagan, Cambridge, MA (US)

(73) Assignee: Nuvera Fuel Cells, Inc., Cambridge, MA (US)

( * ) Notice: Subject to any disclaimer, the term of this patent is extended or adjusted under 35 U.S.C. 154(b) by 10 days.

This patent is subject to a terminal disclaimer.

(21) Appl. No.: 10/335,538

(22) Filed: Dec. 31, 2002

(65) Prior Publication Data

US 2003/0170518 A1 Sep. 11, 2003

Related U.S. Application Data

(63) Continuation-in-part of application No. 09/870,412, filed on May 30, 2001, and a continuation-in-part of application No. 10/309,779, filed on Dec. 4, 2002, now Pat. No. 6,817,182.
(60) Provisional application No. 60/338,637, filed on Dec. 5, 2001, and provisional application No. 60/208,355, filed on May 31, 2000.

(51) Int. Cl.$^7$ .......................... H01M 8/04; H01M 8/12; H01M 2/00; H01M 2/02
(52) U.S. Cl. .............................. 429/17; 429/26; 429/34
(58) Field of Search ............................. 429/17, 13, 26, 429/30, 34, 19

(56) References Cited

U.S. PATENT DOCUMENTS 3,554,174 A    1/1971    Clawson (Continued)

FOREIGN PATENT DOCUMENTS

DE    197 55 116 C 1    3/1999

(Continued)

OTHER PUBLICATIONS

*Fuel Cell Handbook*, 5$^{th}$ ed., pp. 9–37–9–38 by USDOE/NETL (Nat'l Energy Tech. Lab) (Oct. 2000).

(Continued)

*Primary Examiner*—Patrick Joseph Ryan
*Assistant Examiner*—Julian Mercado
(74) *Attorney, Agent, or Firm*—Hamilton, Brook, Smith & Reynolds, P.C.

(57)    ABSTRACT

A hydrogen fuel cell power system having improved efficiency comprises a fuel cell, a source of hydrogen gas, a compressor for creating a pressurized air stream, and a liquid supply which is heated by waste heat form the power system and evaporates into the pressurized air stream to produce a pressurized air and steam mixture. The pressurized air/steam mixture, which is preferably used as the oxidant in the fuel cell, is combusted with fuel in a burner to produce a high-temperature steam-laden exhaust stream. The high-temperature steam-laden exhaust stream drives an expander to produce a power output, and a power take-off from the expander uses the expander power to, for instance, drive an electrical generator, or drive other system components. The evaporation of liquid can take place external to the fuel cell, or can take place directly within the fuel cell, preferably using a cooling liquid that is directly injected into the fuel cell. The fuel cell power system advantageously uses the low-temperature waste heat of the fuel cell to evaporate liquid into the pressurized air, resulting in a steam/air mixture having a relatively large expansion potential.

The systems and related methods of the invention are applicable to a wide range of fuel cell power systems, including a "pure" or "non-hybrid" fuel cell power system, powered by hydrogen from either an external source, such as a hydrogen storage tank, or from "direct" reforming of a fuel at the anode. The invention is also applicable to integrated or "hybridized" fuel cell power systems which contain a local fuel reformer. In these systems, the fuel cell is powered by hydrogen-containing reformate generated by the reformer.

57 Claims, 4 Drawing Sheets

U.S. PATENT DOCUMENTS

| | | |
|---|---|---|
| 3,976,507 A | 8/1976 | Bloomfield |
| 3,982,962 A | 9/1976 | Bloomfield |
| 4,004,947 A | 1/1977 | Bloomfield |
| 4,046,119 A | 9/1977 | Perry |
| 4,128,700 A | 12/1978 | Sederquist |
| 4,166,435 A | 9/1979 | Kiang |
| 4,208,989 A | 6/1980 | Hart |
| 4,365,006 A | 12/1982 | Baker |
| 4,473,622 A * | 9/1984 | Chludzinski et al. ......... 429/19 |
| 4,479,907 A | 10/1984 | Ogura |
| 4,557,222 A | 12/1985 | Nelson |
| 4,622,275 A | 11/1986 | Noguchi et al. |
| 4,644,751 A | 2/1987 | Hsu |
| 4,681,701 A | 7/1987 | Sie |
| 4,696,871 A | 9/1987 | Pinto |
| 4,735,186 A | 4/1988 | Parsons |
| 4,738,903 A | 4/1988 | Garow et al. |
| 4,913,098 A | 4/1990 | Battaglini |
| 4,994,331 A | 2/1991 | Cohen |
| 5,002,481 A | 3/1991 | Förster |
| 5,034,287 A | 7/1991 | Kunz |
| 5,335,628 A | 8/1994 | Dunbar |
| 5,360,679 A | 11/1994 | Buswell et al. |
| 5,449,568 A | 9/1995 | Micheli et al. |
| 5,501,781 A | 3/1996 | Hsu et al. |
| 5,595,059 A | 1/1997 | Huber et al. |
| 5,624,964 A | 4/1997 | Cimini et al. |
| 5,645,950 A | 7/1997 | Benz et al. |
| 5,693,201 A | 12/1997 | Hsu et al. |
| 5,758,606 A | 6/1998 | Rosen et al. |
| 5,811,201 A | 9/1998 | Skowronski |
| 5,873,236 A | 2/1999 | Koyama et al. |
| 5,893,423 A | 4/1999 | Selfors et al. |
| 5,896,738 A | 4/1999 | Yang et al. |
| 5,948,221 A | 9/1999 | Hsu |
| 5,976,332 A | 11/1999 | Hsu et al. |
| 5,976,722 A | 11/1999 | Müller et al. |
| 5,981,096 A | 11/1999 | Hornburg et al. |
| 5,985,474 A | 11/1999 | Chen et al. |
| 5,993,984 A | 11/1999 | Matsumura et al. |
| 5,998,885 A | 12/1999 | Tamor et al. |
| 6,001,499 A | 12/1999 | Grot et al. |
| 6,077,620 A | 6/2000 | Pettit |
| 6,085,512 A | 7/2000 | Agee et al. |
| 6,106,963 A | 8/2000 | Nitta et al. |
| 6,120,923 A | 9/2000 | Van Dine et al. |
| 6,130,259 A | 10/2000 | Waycullis |
| 6,190,791 B1 | 2/2001 | Hornburg |
| 6,196,165 B1 | 3/2001 | Rósen et al. |
| 6,213,234 B1 | 4/2001 | Rosen et al. |
| 6,260,348 B1 | 7/2001 | Sugishita et al. |
| 6,316,134 B1 | 11/2001 | Cownden et al. |
| 6,365,289 B1 | 4/2002 | Lee et al. |
| 6,365,290 B1 | 4/2002 | Ghezel-Ayagh et al. |
| 2002/0004152 A1 | 1/2002 | Clawson et al. |
| 2002/0163200 A1 | 11/2002 | Oglesby et al. |

FOREIGN PATENT DOCUMENTS

| | | |
|---|---|---|
| EP | 0 920 064 A1 | 6/1999 |
| EP | 1 104 039 A2 | 5/2001 |
| JP | 58-005975 | 1/1983 |
| JP | 58-165273 | 9/1983 |
| JP | 60-051604 | 3/1985 |
| JP | 2000-200617 | 7/2000 |
| WO | WO 01/63992 | 10/2000 |
| WO | WO 01/25140 | 4/2001 |
| WO | WO 01/95409 A2 | 12/2001 |

OTHER PUBLICATIONS

* cited by examiner

HIGH-EFFICIENCY FUEL CELL POWER SYSTEM WITH POWER GENERATING EXPANDER

RELATED APPLICATIONS

This application is a continuation-in-part of U.S. application Ser. No. 09/870,412, filed May 30, 2001, which claims the benefit of U.S. Provisional Application No. 60/208,355, filed May 31, 2000. This application is also a continuation-in-part of U.S. application Ser. No. 10/309,779, filed Dec. 4, 2002 now U.S. Pat. No. 6,817,182, which claims the benefit of U.S. Provisional Application No. 60/338,637, filed Dec. 5, 2001. The entire teachings of the above applications are incorporated herein by reference.

BACKGROUND OF THE INVENTION

A fuel cell is an electrochemical device that converts the chemical energy of a reaction into electrical energy. A fuel cell consists of an anode and a cathode separated by an electrolyte layer. In operation, a reactant, typically hydrogen gas, is fed to the anode, and an oxidant, typically air or other oxygen-containing gas, is fed to the cathode. The electrochemical reactions which take place at the fuel cell produce an electric current. Fuel cell power systems generally comprise aggregated series of cells, often called fuel cell "stacks," to provide higher voltages than are obtainable with a single cell.

Fuel cells have become useful sources of energy in recent years, and there is increasing interest in the use of fuel cells for small-scale and mobile power generation, including vehicular power applications. One impediment to the widespread acceptance of fuel cell power systems is the lack of a broad infrastructure for the production and distribution of fuel, particularly hydrogen, required to operate the fuel cell. Attempts have been made to overcome this problem through the use of hybrid power systems which run on conventional hydrocarbon fuels. In these systems, the hydrocarbon fuels are first converted to hydrogen-containing reformate via an integrated on-board fuel reformer, and the resultant reformate is then used to power the fuel cell.

In the future, it is anticipated that it will become increasingly cost-effective to employ non-hybridized or "pure" hydrogen fuel cell power systems (i.e. with no reformer present), in which the hydrogen is provided by a local hydrogen storage system or (in static applications) directly from a remote source. Also, the use of a separate fuel reformer sub-system can be avoided by feeding the fuel cell with an easily-reformed fuel, such as an alcohol, particularly methanol, so that hydrogen can be formed in situ at the fuel cell anode.

In any of these fuel cell-based power systems, particularly in the case of mobile or portable power generating applications, even modest increases in system efficiency can make a critical difference in terms of size, weight, and cost-effectiveness of the system.

SUMMARY OF THE INVENTION

In general, the present invention relates to fuel cell-based power systems, including integrated fuel reformer/fuel cell systems and "pure" hydrogen-based fuel cell power systems, having improved efficiency. In one aspect, the fuel cell systems of the present invention advantageously utilize low-temperature waste heat of the fuel cell to generate additional power, thus permitting improvements in overall system efficiency. The system comprises a fuel cell having an anode and a cathode; a source of hydrogen gas which is provided to the anode of the fuel cell; and a compressor which creates a pressurized air stream that is provided to the cathode of the fuel cell. The pressurized air stream of the cathode and the hydrogen gas of the anode react at the fuel cell to produce an electrical power output and waste heat. The system further comprises a cooling liquid (e.g. water), which removes low-temperature waste heat from the fuel cell. The cooling liquid, warmed directly or indirectly by waste heat from the power system, is evaporated into a pressurized air stream, which may be the oxidant air stream to, from, or within the fuel cell cathode, to produce a pressurized steam-laden air stream. The steam-laden air stream is then fed, along with a fuel, to a burner, where it is burned to generate a high-temperature steam-laden exhaust stream. The steam-laden exhaust stream is used to drive an expander, such as a turbine, to provide a power output. The power output from the expander is generally in excess of the power used to compress the air, and the expander power can be used, via a power take-off, to drive auxiliary components of the system, such as a compressor or pump, and/or to supplement the system power output from the fuel cell, such as by driving an electrical generator.

In certain embodiments, the system includes a cooling loop in which a fluid circulates through the system to remove waste heat from the fuel cell. The cooling liquid which is evaporated into the pressurized air can comprise the cooling loop fluid, or can be heated by the cooling loop fluid.

In other embodiments, the fuel cell is cooled by direct injection of a cooling liquid into the fuel cell. In this case, the cooling liquid can be evaporated into the pressurized air while inside the fuel cell.

The present invention is able to achieve improved fuel cell and Brayton cycle efficiencies by advantageously utilizing the low-temperature waste heat from the fuel cell power system. The waste heat generated in conventional low-temperature fuel cells, such as the well-known "PEM" cells (polymer electrolyte membrane or proton exchange membrane cells; sometimes called solid polymer electrolyte membrane cells), is notoriously difficult to recapture in a way that produces additional useful power. For instance, most low-temperature fuel cells operate at temperatures of less than 200° C., and even more typically at temperatures of less than 100° C. Currently existing PEM fuel cells operate at temperatures between 50° C. and 100° C., for example. The heat rejection temperatures for these low-temperature fuel cells are much too low to recover energy via conventional means, such as steam turbine or other Rankine-type "bottoming cycles." Consequently, the waste heat of such low-temperature fuel cells is simply discharged to the environment through a closed-loop radiator or other means.

In the present invention, on the other hand, at least a portion of this low-temperature waste heat is advantageously recaptured by using the energy of the waste heat to evaporate water into a pressurized air stream (e.g. the fuel cell cathode air stream) to produce a pressurized steam/air stream having a significant expansion potential. This steam/air mixture is then burned in a burner, and the system is thus able to generate significant excess power by the expansion of steam-laden burner exhaust. The steam provides an additional mass flow (i.e. specific-heat adjusted mass flow) through the expander as compared to the exhaust air alone. In effect, the present invention adds a Rankine, or steam cycle, power addition to a Brayton turbo-compressor bottoming cycle.

Moreover, this excess power of the expander can be obtained at little or no cost, as it is derived from the recovery of low temperature "waste" heat via evaporation of warm water into pressurized air (i.e. the "partial pressure effect"). The energy gained is essentially the latent heat consumed to vaporize water. The latent heat is a significant quantity: it takes about 2326 joules per gram to evaporate water at 60° C., while it takes only about an additional 1465 joules per gram to heat the evaporated water (steam) by an additional 800° C. The sequence of pressurization of air before evaporation of water is important to maximize efficiency improvements, because while significant energy is expended to compress the air, very little energy is required to compress water to the same pressure.

In certain embodiments, the fuel cell power system comprises an integrated, or "hybrid" fuel cell/fuel reformer system. In this system, the source of hydrogen for the fuel cell is a fuel reformer (or fuel processor), which converts, via one or more chemical reactions, an input fuel, such as a conventional hydrocarbon fuel, into a hydrogen-containing reformate. The reformate is then used as fuel at the anode-side of the fuel cell. Typically in such systems, a burner is used to provide heat to support the endothermic fuel reforming reaction. In certain embodiments of the present invention, the steam-laden exhaust from the fuel cell can be fed to the reformer burner, and burned with fuel (the fuel optionally including unused hydrogen from the fuel cell), to produce the steam-laden exhaust which drives the expander.

In other embodiments, the fuel cell power system comprises a non-hybridized or "pure" hydrogen fuel cell. These fuel cells are not integrated with a local reformer, but are instead powered by hydrogen from another source, such as stored hydrogen, or hydrogen provided from a remote location. A conventional "pure" hydrogen fuel cell does not include a burner, as there is no need to support a fuel reforming reaction. In a typical device, hydrogen is provided to the anode side of the fuel cell, which is "dead ended," meaning that, during operation, the hydrogen remains contained within the anode. Periodically, the contents of the cell, such as water and any unreacted hydrogen, are discharged to the environment via a "purge" cycle, and a new supply of hydrogen is added to resume fuel cell operation.

In contrast, the "pure" hydrogen fuel cell system of the present invention comprises a burner for burning fuel with the pressurized air/steam mixture to provide the steam-laden exhaust stream used to drive the expander. In certain embodiments, the fuel burned at the burner comprises unreacted hydrogen that is recycled, periodically or continuously, from the fuel cell anode. The fuel may additionally comprise fuel from the same source used to provide hydrogen to the fuel cell, such as a hydrogen storage tank. The waste heat from the power system is at least partially recovered by evaporating water, warmed by the waste heat, into a pressurized oxidant stream, before, after, and/or while the oxidant is within the fuel cell. The resultant air/steam mixture can then optionally be preheated by the burner exhaust, (which optionally may provide for further evaporation of water into air), and is then burned with the fuel to produce the steam-laden burner exhaust. The exhaust is then expanded in an expander to produce power, typically substantially in excess of the power used to compress the air.

The pure hydrogen fuel cell power system of the present invention advantageously uses a pressurized air stream as the cathode oxidant, which results in increased fuel cell power output, or smaller fuel cell size for a given output power. Moreover, this added performance due to higher pressure is "free" in terms of parasitic load, as the power generated by the expansion of the steam-laden exhaust more than compensates for the power required to pressurize the air. Of course, the addition of the burner tends to decrease system efficiency, as typically some excess fuel is consumed by the burner. However, this is more than offset by the energy recaptured from the waste heat of the system via the evaporation of water into the pressurized cathode air stream. The expansion of the steam-laden exhaust creates net energy, in excess of the cost of compressing the air and any excess fuel used in the burner, and therefore overall system efficiency is improved. The resulting system is also typically very flexible and can respond rapidly to transients.

According to yet another aspect, the present invention comprises a fuel cell power system and a method of operation of such a system, the system comprising a fuel cell with an anode and a cathode, a compressor for creating a pressurized air stream, the air stream being provided to the cathode of the fuel cell for generating an electrical power output, a cooling liquid in fluid communication with the pressurized air stream, at least a portion of the cooling liquid being heated by waste heat from the power system and evaporating into the pressurized air stream to produce a pressurized mixture of air and steam, a burner for combusting fuel with the pressurized steam/air mixture to produce a high-temperature exhaust steam-containing exhaust stream, and an expander that is driven by the exhaust to produce a power output. Additionally, the system comprises a condensing apparatus, such as a radiator, for recovering at least a portion of the evaporated liquid from the expanded burner exhaust prior to discharge of the exhaust from the system. In certain embodiments, the system additionally comprises an apparatus for applying a backpressure to the burner exhaust to facilitate recovery of evaporated liquid from the burner exhaust. The backpressure can be selectively applied to raise the dew point of the exhaust stream, and thus make the liquid in the exhaust more easily recoverable, particularly when the system is operated at high ambient temperatures. This technique is applicable to "pure" hydrogen fuel cells, and to "direct" fuel cells that convert fuel to hydrogen directly in the fuel cell, as well as to "hybrid" fuel cell power systems which include an integrated fuel reformer sub-system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
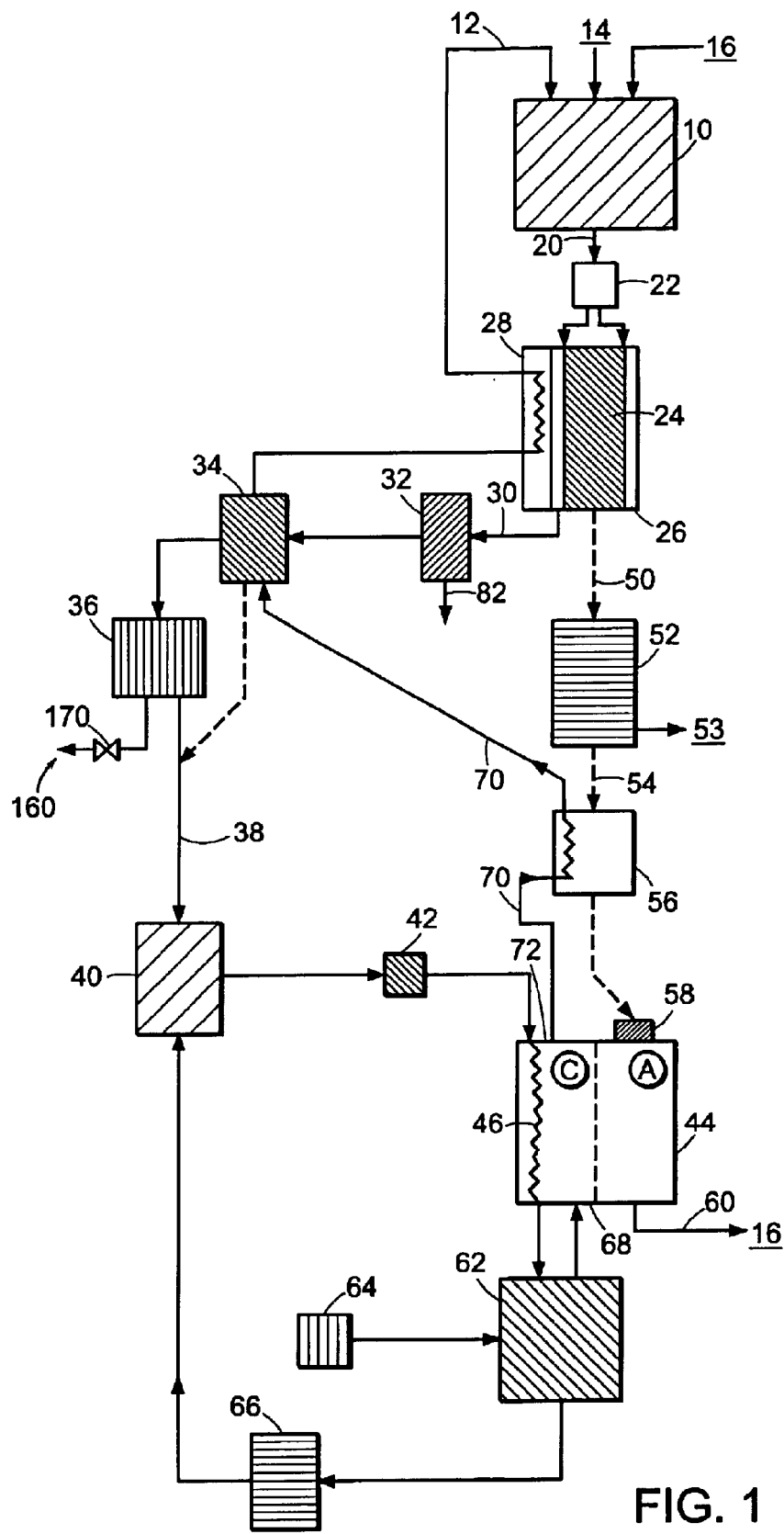
FIG. 1 is a schematic diagram of an integrated fuel cell/fuel reformer power system of the invention.

The present invention relates in general to methods and apparatus for improving the efficiency of operation of fuel cell power systems by recovery of low temperature waste heat from the power system, and conversion of this heat into useful energy. The power systems described herein utilize a fuel cell, which is a device for producing electricity by the electrochemical reaction of two reactants, typically hydrogen and oxygen, across a barrier. Fuel cells are typically aggregated into a fuel cell "stack," to produce a higher voltage output than is available from a single fuel cell. As used herein, the term "fuel cell" encompasses both single fuel cells and fuel cell "stacks," unless specified to the contrary.

Fuel cells to which the present invention is particularly applicable include fuel cells rejecting heat below about 200° C., and more typically about 100° C. "PEM" fuel cells are the most common of these "low-temperature" fuel cells. These devices use a polymeric membrane across which an electrical potential is generated, and the properties of the membrane limit the operating temperature of the fuel cell to about 100° C. at present. In the future, it is expected that this temperature limit will rise to 150° C. or more, and may possibly approach 200° C. A characteristic of these low-temperature fuel cells is that they do not operate at a high enough temperature to permit the use of conventional steam turbine bottoming cycles for efficient energy recovery. Variant types of PEM cells, such as the "direct methanol" type (where hydrogen is created directly on or near the membrane by catalytic reforming of methanol, or sometimes other alcohols or fuels, in situ), typically also have operating temperatures in this same range.

The present invention is applicable to integrated fuel reformer/fuel cell power systems, as well as to non-hybridized or "pure" hydrogen fuel cell power systems. An integrated fuel reformer/fuel cell power system comprises a fuel reformer (also referred to generally as a fuel processor) which converts a hydrocarbon-based fuel into reformate, generally containing hydrogen, carbon dioxide, and traces of other gases, and the reformate is then used by the fuel cell to generate electricity. A fuel processor typically also contains auxiliary devices to minimize the concentration certain components, such as carbon monoxide, which are harmful to the fuel cell.

In contrast, a non-hybridized or "pure" hydrogen fuel cell power system does not use a separate fuel processor or reformer to supply the hydrogen fuel for the fuel cell. In a non-hybridized system, typically the hydrogen is provided from a hydrogen storage source, such as a storage tank of pressurized hydrogen gas, hydride storage in metal matrices, or liquid hydrogen. Stored hydrogen may also include hydrogen stored in an easily-mobilized or labile chemical form, such as sodium borohydride. With borohydride, hydrogen can be liberated from a dry chemical by the addition of water. The hydrogen could also be provided from a remote source, via a hydrogen pipeline, for instance. In general, the hydrogen used in a non-hybridized fuel cell is substantially "pure" hydrogen fuel, meaning that the fuel is substantially free of non-hydrogen components, particularly any components which would be harmful to the fuel cell.

First Embodiment

One embodiment of an integrated fuel reformer/fuel cell power system of the invention is schematically illustrated in FIG. 1. A burner 10 receives feeds of air/steam 12, fuel 14 and preferably recycled fuel cell anode exhaust 16, and combusts them to create a hot exhaust 20. Any or all of the burner inputs (air, fuel, and recycled fuel cell exhaust) may be preheated by heat exchange in any suitable zone containing heat to be removed. In particular, the air/steam flow 12 is typically preheated, as described below.

The exhaust transfers its heat to a reformer 24 by contact of the exhaust with the walls of the reformer and/or by other types of heat exchanger, such as the shell-type exchanger 26 that is schematically illustrated. The reformer has inputs of fuel, steam, and optionally oxygen or air, depending on the exact design of the system (these inputs are not labeled for clarity). The heat-exchanger 26 optionally may have additional heat exchange provisions 28 for superheating of the air/steam before its injection into the burner at 12. The partially-cooled burner exhaust 30 then passes through an expander 32, from which mechanical energy is recovered. An alternative location for the expander is shown at 22. This configuration is preferably used with easily reformed fuels.

The exhaust then passes through a heat exchanger 34, and then into a condenser 36 to capture water for recycling, and the residual gas is discharged. The recycled water 38 is recovered in a reservoir 40 that is connected to a pump 42, which supplies water to the fuel cell 44. Water is also supplied to the reservoir from other locations in the system at which it is recovered.

The reformate 50 is passed through a carbon monoxide removal system 52, unless the fuel cell does not require CO removal. The CO removal system may have inputs of steam, water or air (not marked), and has an output of low-CO-reformate or hydrogen 54. In the latter case there may also be an output of hydrogen-depleted reformate 53, which, when present, is recycled to the burner 10. Hydrogen-containing gas 54 is then passed through an optional heat exchanger 56. The heat exchanger 56 may incorporate or be supplemented by a condenser to remove water from the gas. The heat exchanger 56 is optional, particularly if the CO removal device is a PSA (pressure swing absorption apparatus) or membrane separator. The reformate or hydrogen then enters the fuel cell 44, optionally through a pressure reducer 58. The exhaust 60 of the anode side of the fuel cell is recycled to the burner inlet 16.

The fuel cell 44 receives pressurized water from the pump 42. The water passes through heat exchanger 46 in the fuel cell, thereby providing cooling to remove the heat generated by the fuel cell. The cooling water passes into a mixer 62. In the mixer, the warm cooling water is mixed with compressed air supplied by a compressor 64, and water evaporates, transferring its latent heat of evaporation to the resulting air/steam mixture. The amount of compressed air supplied is typically at least 100% above the stoichiometric amount required by hydrogen consumption at full power. Water that does not evaporate, if any, is recycled through an optional radiator 66 to the water reservoir 40. Alternatively, some or all such water is injected into the air/steam mixture after it has passed through the fuel cell.

The compressed and optionally saturated air from the mixer 62 enters the fuel cell 44 at an inlet 68 to provide oxidant to the fuel cell cathode compartment. The air/steam mixture 70 leaves the fuel cell at outlet 72 and is heated by exchange with system components. For example, it can be heated by exchange with the reformate 50, through heat exchanger 56, or through a heat exchanger (not illustrated) at a location between the CO removal system 52 and the reformer 24. Low-temperature heat may also be recovered at any of the various condensers, such as condenser 36, before entering the high temperature stage of heating. The air/steam mixture 70 may optionally also be preheated by heat exchangers in the CO removal section 52. Additional water may be added to the air/steam mixture in the low-temperature part of the system, i.e., from the outlet of the fuel cell up to about the inlet portion of heat exchanger 34, to facilitate heat absorption. Addition of water to hotter portions of the air/steam path is possible but less advantageous.

The air/steam mixture 70 is then raised to a higher temperature by heat exchange with the burner exhaust in heat exchanger 34. This heat exchange step recovers most of the heat from the burner exhaust after it exits the reformer and the expander, and prepares the exhaust for condensation to recover water. The air/steam mixture leaves the exhaust heat exchangers as superheated vapor. Any residual liquid water in the air/steam mixture is preferably removed and recycled, for example to the reservoir 40, before superheating of the vapor. As an optional further heating step, the air/steam mixture is further superheated, for example by exchange with the exhaust above the expander 28 or with the reformate at 50.

Finally the air/steam mixture is fed into the burner at the air/steam inlet 12, mixed with one or more streams of fuel, recycled reformate and anode exhaust, and combusted to obtain burner exhaust gas at a high temperature, typically about 2000 deg. F. (1150 deg. C.). In the joint cycle of the invention, the burner exhaust gas is loaded with steam, and is still pressurized above atmospheric pressure. This creates additional expansion potential compared to a burner exhaust stream not containing steam, and this extra expansion potential can be captured by an expander 32, such as a turbine.

The expander 32 can be located at any point in the path of the burner exhaust, but certain locations are favored by the temperature profile of the particular system. In the system shown, a preferred location for the expander 32 is after the exhaust has heated the reformer 24. This allows the exhaust, with an initial temperature of 2000 deg. F. (1150 deg. C.) or more, to heat the reformer to a temperature of about 1400–1800 deg. F. (770–1000 deg. C.). The exhaust, now at about 1400–1600 deg. F.(ca. 770–890 deg. C.), is now cool enough to operate a conventional expander, such as an automotive grade expander turbine. It is thermodynamically advantageous to operate the expander at as high a temperature as feasible.

The expander is used to produce a mechanical power output. A power take-off 82 from the expander can be utilized, for example, to drive an electrical generator to produce electrical power, and thus supplement the system power output from the fuel cell. This may be particularly important at system startup and during system transients to increased power, where the very rapid increase in electric driving potential provided by the expander can compensate for the relatively slow warm-up and response of the reforming system as a whole. Rapid response is particularly important in transportation applications. The power from the expander may instead or in addition be used to drive mechanical components of the system, such as a pump or a compressor.

After expansion in the turbine or other expander, the exhaust is cooled by expansion by about 200 to 400 deg. F. (110–220 deg. C.), and is at about atmospheric pressure. The exhaust then heats the incoming steam/air mixture in heat exchanger 34, which also separates any excess water from the air/water/steam mixture, after which the exhaust is passed through a condenser 36 to recover water. The water is returned to the reservoir, completing the cycle. The exhaust exits the system at 160.

The condensing radiator 36 or other water recovery apparatus may not be necessary in all systems, such as stationary power systems, or in other applications where recovery of water is not necessary or not desirable.

For applications where water recovery is desirable, such as mobile applications, it will be important to ensure that the dew point in the exhaust is high enough to permit efficient water recovery. When ambient temperatures are low, for example 25° C. or less, then condensation of water from a 60° C. exhaust stream is easy to achieve. However, when ambient temperatures reach higher temperatures, such as 40° C., water recovery becomes more difficult. The usual solution to this problem is to size the radiator for the worst expected case of ambient temperature, but this can be awkward and expensive, especially in a mobile system. Because the system of the present invention is pressurized, an alternative approach can be used. At high ambient temperatures, a backpressure can be selectively imposed on exhaust outlet 160 by, for example, a flow-restricting variable valve 170. The backpressure raises the dew point of the exhaust stream, because the saturation volumetric concentration of water in air decreases with increasing air pressure, thus making the water in the exhaust more easily recoverable. For example, if a system is operated at 4 atmospheres, a backpressure of 0.5 atmospheres can increase the dew point by 10 to 20° C., which allows efficient recovery at higher ambient temperatures without increase of radiator size. There is a penalty for the backpressure in terms of decreased system efficiency, since there is less pressure drop through the expander. However, back pressure can be regulated to be the minimum required to recover sufficient water under ambient conditions, thus allowing the system—for example, in an automobile—to operate under various temperature and climatic conditions while maintaining the maximum efficiency possible under those conditions.

Second Embodiment

Figure 2:
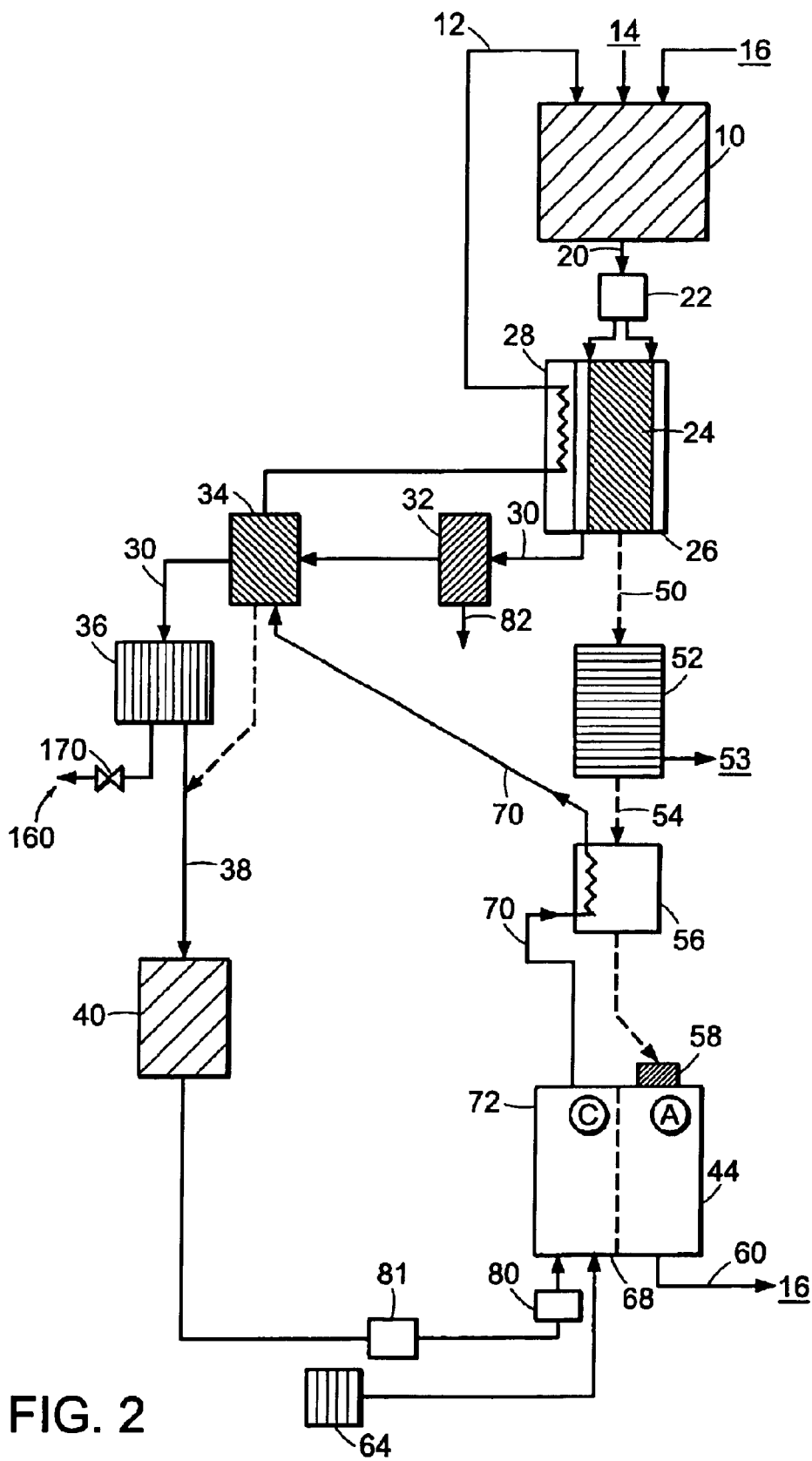
FIG. 2 is a schematic diagram of an integrated fuel cell/fuel reformer power system using direct water injection.

A second exemplary embodiment of an integrated fuel reformer/fuel cell power system of the invention is shown in FIG. 2. This embodiment is similar to the embodiment shown in FIG. 1, except that here, the pressurized air/steam mixture is produced (at least in part) by direct injection of water into the fuel cell stack. The injected water thus achieves the dual functions of cathode air humidification, as well as cooling of the fuel cell. Direct water injection for fuel cell humidification/cooling is described in greater detail in commonly-owned International Application No. PCT/EP00/03171 (Publication No. WO 00/63992), the entire teachings of which are incorporated herein by reference. Direct water injection can be used as a supplement to, or even a replacement of, the previously-described fuel cell cooling loop. As shown in FIG. 2, the saturator/mixer 62 (from FIG. 1) has been replaced by an injector 80 and pump 81. Water is supplied to injector 80 in a desired amount by pump 81, and the water is injected into the fuel cell stack. The water can also be injected into a separate apparatus for mixing with the cathode air before the water and cathode air are together injected into the fuel cell. The amount of water that is injected can be determined by the system controller so that enough water is supplied to remove sufficient heat from the stack, via evaporation of the water, to balance the stack temperature at a pre-determined level. This evaporation will also substantially or completely saturate the cathode air, thus producing a steam-laden exhaust stream 70 from the stack. If necessary, additional water can be added to air/steam stream 70 at other points in the system. For instance, additional water can be evaporated into the stream 70 at heat exchangers 56 or 34, using heat from the reformate 54 and burner exhaust 30, respectively. It is also possible to simultaneously employ a cooling loop along with the direct water injection, which provides heat management capabilities under a wide variety of conditions, such as when the burner 10 is not being used.

Efficiencies of the Above Embodiments

Calculations of the amount of additional system efficiency indicate that a significant increase is possible with the complete system of recuperation of the fuel cell heat that is shown here. The exact values depend on the mode of operation of the system and numerous additional variables. Typical numbers for system efficiency for mobile systems are in the range of about 30–35%. Recovery of half the energy value of the fuel cell waste heat can raise the system efficiency by at least 5%, more typically 15% or more, for example from a system efficiency of 35% to 41% (a 15% gain in efficiency.) Recovery of higher proportions of the fuel cell waste heat is possible, and may further raise efficiency. Higher efficiencies may require additional air supply, which, as noted above, may not necessarily pass through the fuel cell.

In addition to the efficiency gains made by recovering heat from the fuel cell by evaporation of water and using that steam to drive an expander, it should be noted that the use of the expanded exhaust to preheat the feeds for the burner also promotes efficiency. This is accomplished by providing for 100% recuperation of the extra fuel energy required to drive the expander. Normally, with a separate recuperator, the energy input used to drive an expander cannot be completely recovered.

To understand how this is possible, consider the heat exchanger 34 in FIG. 1, which acts as the recuperator of the expander in the disclosed arrangement. The input air/steam 70 is at a particular temperature, for example 200 deg. F. (ca. 95 deg. C.), and the design temperature of the output to the condenser 36 is at, for example, 400 deg. F. (ca. 205 deg. C.). If there is no expander in the system, the burner exhaust will enter heat exchanger 34 at about 1600 deg. F. (ca. 890 deg. C.) and the air/steam mixture will leave the recuperator at about 1400 deg. F. (ca. 780 deg. C.). The inefficiency of this step is built into the design. However, if there is an expander 32 in the system, then the burner exhaust will enter the recuperator at a lower temperature, about 1300 deg. F. (ca. 720 deg. C.). The air/steam then will leave the recuperator at only about 1100 deg. F. (ca. 610 deg. C.). The 300 deg. F. (ca. 165 deg. C.) difference is made up by burning additional fuel in the burner so that the burner exhaust will leave the burner 10 and heat the reformer 24 at about 1800–2000 deg. F. (ca. 1000–1100 deg. C.). However, this energy is exactly the energy that is recovered in the expander, as the exhaust drops from 1600 to 1300 deg. F. (from ca. 890 to ca. 720 deg. C.) on passing through the expander. Therefore, because all of the heat added to drive the expander is recovered, the expander is effectively 100% efficient, compared to a system without the expander.

It is thus particularly advantageous in this embodiment of the joint cycle to use a heat exchanger operating between the air/steam feed, and the burner exhaust, as the primary recuperator for the expander.

Efficiency gains in this range are significant in three ways. First, the efficiency of a system incorporating the joint cycle may approach that of a bottoming cycle internal combustion engine, while retaining the advantages of a fuel cell in terms of low emissions. Second, the joint cycle, which rejects less heat to the environment, allows use of a smaller fuel cell and fuel generator for a given power output, saving weight and cost. Third, a higher efficiency directly translates into a smaller heat disposal means, such as a radiator or condenser, for a given output level. Since the second and third effects multiply, reduction in the area of the radiator is potentially very significant.

A key principle of the joint cycle is the extraction of energy from low-temperature "waste" heat, particularly the waste heat of fuel cell operation, by using it to evaporate water into compressed air. The resulting air/steam or air/ steam/water mixture is then heated, in any convenient way, and is finally injected under pressure at high temperature into an expander. The expander is harnessed to create mechanical work. The net mechanical work generated corresponds to the latent heat imparted to the air/steam/water mixture—and subtracted from cooling water and the like— by the evaporation of water. The latent heat absorbed is the basis of the net energy gain achieved by the use of the joint cycle.

The joint cycle, being the combination of evaporation, heating and expansion as described above, is, in principle, suitable for enhancing the efficiency of any fuel cell based power system. Its extra complexity is best justified when the waste heat to be recovered is at a low temperature, so that it is difficult to use the waste heat to directly make steam. It is particularly advantageous for a PEM fuel cell, in which the upper operating temperature is typically below about 100 deg. C. Note, however, that a joint cycle application to higher temperature PEM membranes extracts greater gains through higher pressure operation with more steam.

Adaptations may be required, and options are contemplated, particularly in the details of heat transfer and exchange, depending on the exact types of modules composing the system. The reformer has been illustrated in the embodiment of FIG. 1 as a steam reformer, but at least some partial oxidation, whether in a separate module or in the autothermal reactor mode, can be used. The carbon monoxide removal system may be a combination of a water gas shift and a preferential oxidation, or may be via a PSA, a TSA, a preferential methanation, or a hydrogen selective membrane, with or without a water gas shift. Any expander is in principle useful, but a turbine is the preferred choice in terms of small, light, commercially available expanders operating in the 1000–2000 deg. F. (550–1150 deg. C.) range.

It has long been a goal in the development of fuel cell technology to increase system efficiency. Thus, the modifications to a fuel reformer/fuel cell system provided by the incorporation of the joint cycle of the invention are significant, and are expected to enhance the commercial success of integrated reformer/fuel cell systems.

Third Embodiment

The "joint cycle" can also be applied to systems that do not contain a reformer. By addition of a burner to combust waste fuel from the anode, and by use of the waste heat of the fuel cell to evaporate water into compressed air, a steam-laden exhaust stream can be provided to an expander, thereby allowing the capture of the waste heat as mechanical energy.

Figure 3:
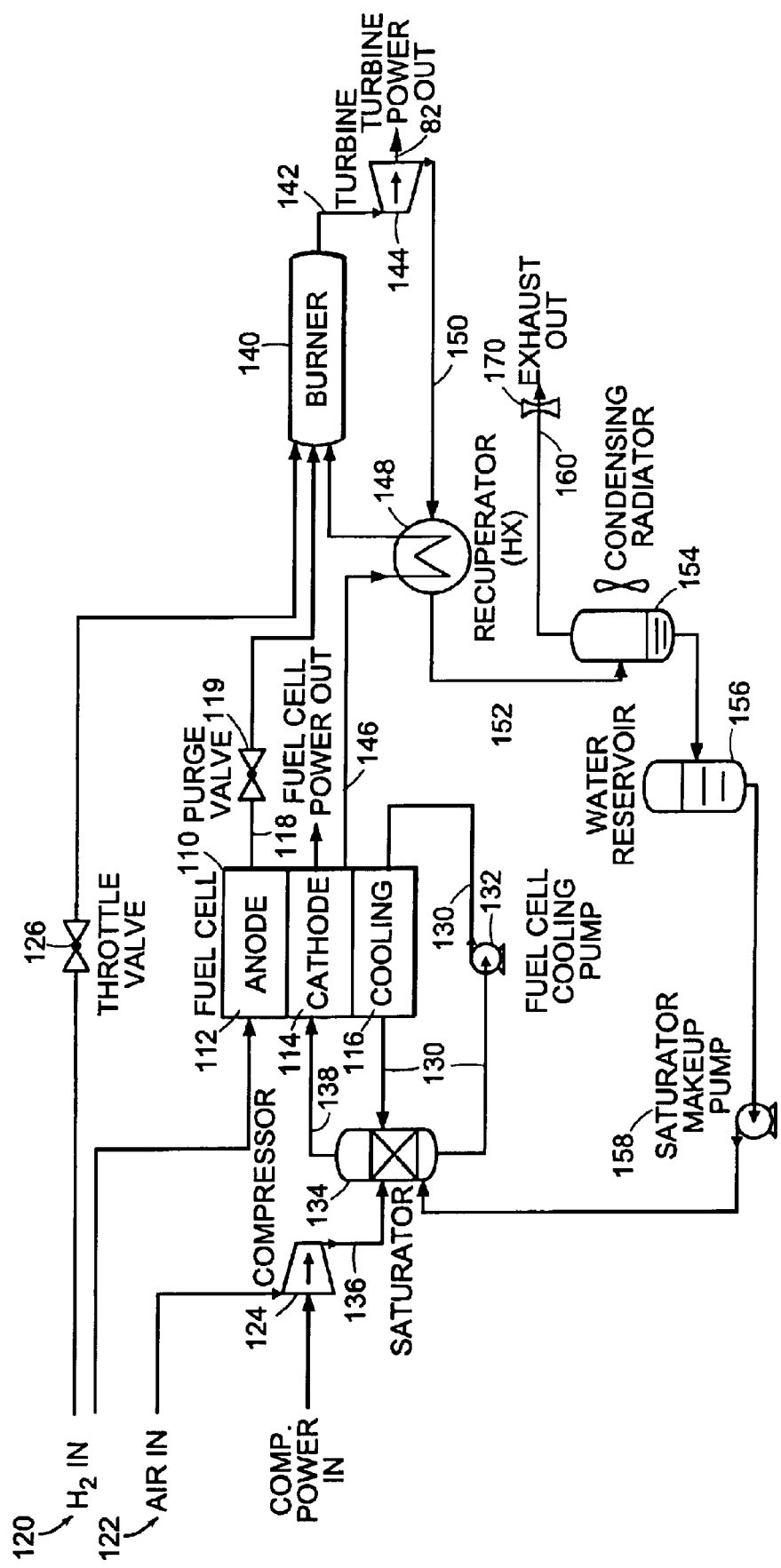
FIG. 3 is a schematic diagram of a non-hybridized hydrogen fuel cell power system according to another embodiment of the invention.

An example of a non-hybridized "pure" hydrogen fuel cell power system of the invention is illustrated schematically in FIG. 3. A fuel cell stack 110, such as a PEM stack, has an anode compartment 112, a cathode compartment 114, and a cooling apparatus 116. The anode 112 is fed with hydrogen from a pressurized source 120, such as a storage tank. The cathode 114 is supplied with an oxygen-containing gas, which preferably comprises a pressurized air/steam mixture. Electrochemical reactions between the hydrogen and oxygen-containing reactants of the fuel cell produce an electrical power output.

In addition to useful electrical power, the fuel cell also generates waste heat, which is removed from the fuel cell stack by cooling apparatus 116. The cooling apparatus 116 generally comprises a section of a cooling loop 130 in thermal contact with the cathode 114 and anode 112 sections of the fuel cell 110. Pressurized cooling water, driven by pump 132, is circulated through the cooling apparatus 116.

Waste heat from the fuel cell 110 is transferred to the lower-temperature cooling water, which is then pumped out of the fuel cell 100 to remove the waste heat from the cell. After leaving the fuel cell 110, the heated cooling water is fed to a saturator 134. The saturator 134 also receives, via line 136, air from air inlet 122 which has been pressurized by compressor 124. The warm water (ca. 60–70 deg. C.) from the cooling loop 130 is partially evaporated into the compressed air 136, producing a saturated mixture of air and steam. The evaporation of warm water into a pressurized gas, which is typically air or other oxidant, is referred to generally as "partial pressure boiling."

The water can be warmed directly as coolant, or indirectly by heat exchange with a coolant or an exhaust. The water is pressurized and mixed with pressurized air to partially or completely saturate the air with water at about the coolant temperature, or less. It will be understood that the partial pressure boiling of cooling water into pressurized air may be accomplished in an external saturator 134 as shown in FIG. 1, or inside the fuel cell stack 110 (as described in more detail below). Also, some or all of the partial pressure boiling can optionally occur downstream of the fuel cell stack 110, rather than before the pressurized air stream enters the cathode as shown in FIG. 1.

Returning to the embodiment of FIG. 3, the water-saturated air is conveyed to the fuel cell cathode 114 via line 138, where it serves as the oxidant reactant for the fuel cell. The air-steam mixture then exits the fuel cell as exhaust, and the humidified cathode exhaust 146 is conveyed to a burner 140.

In this embodiment, the anode side of the stack 112 is typically operated in "dead-ended" mode; that is, the anode exit is closed off by a purge valve 119 that opens at timed intervals to release anode exhaust 118, which includes condensed water along with some un-utilized hydrogen, from the stack. Like the cathode exhaust 146, the purged anode exhaust 118 is also fed to the burner 140.

At the burner 140, any hydrogen contained in the anode exhaust 118 is combusted with the steam/air mixture of the cathode exhaust 146 to produce a high-temperature steam-laden exhaust stream 142. The burner 140 is preferably also provided with additional hydrogen fuel from the supply 120, entering through controllable throttle valve 126. Optionally, a fuel from another source, including a non-hydrogen fuel, could be used to provide any excess fuel to the burner that is required beyond what is supplied by the anode exhaust.

In general, the amount of fuel needed to operate the burner (including both anode exhaust fuel and any other fuel) is up to about one-half the amount of fuel needed for the fuel cell. To supply the burner with fuel, the fuel cell can be configured to provide a significant amount of hydrogen by-pass to the burner (i.e. the fuel cell does not necessarily need to be operated in "dead-end" mode). This reduces the amount of membrane electrode area required for a given power output, and therefore reduces the cost of the power system, as electrode area is a significant capital cost of the system, due to the platinum and other costly materials in the catalyst.

From the burner 142, the pressurized steam-laden exhaust stream 140 then expands through the expander 144, typically a turbine, to produce mechanical power. The mechanical power from the expander 144 can be used to drive the compressor 124 which provides the pressurized air stream 136. The mechanical power from the expander 144 could also be used, via power take-off 82, to drive an electrical generator to produce electrical power, and/or to drive mechanical components of the system, such as a pump or a compressor, and/or otherwise supplement the output power of the system. Placement of the expander as the next component downstream of the burner is preferred, but if the expander cannot tolerate such a high temperature, the burner exhaust can first be cooled slightly by heat exchange with a suitable flowing fluid, for example, the fuel entering from valve 126, or the air-steam stream 146 from heat exchanger 148, before the exhaust enters the expander 144.

The pressurized air-steam exhaust stream from the cathode 146 is preferably preheated prior to entry into the burner 140. As shown in FIG. 1, for example, the air/steam cathode exhaust stream 146 is heated in heat exchanger/recuperator 148 by heat exchange with the expanded turbine exhaust 150. Optionally, preheating of burner inputs could occur by heat exchange with the exhaust before it is expanded (not illustrated), as an alternative to or in addition to preheating burner inputs via heat exchange with the exhaust after it has been expanded. While some expander-generated energy would be lost by heat exchange with the exhaust stream prior to expansion, the cooler exhaust could allow less expensive expanders to be used.

Finally, the cooled exhaust stream 152, after passing through the preheat heat exchanger 148, is preferably passed through a condensing radiator 154 to reclaim water. Water from the condensing radiator 154 is recycled to a reservoir 156 and is supplied to the saturator 134 by a pump 158. The cooled exhaust stream 160 leaves the system at exhaust outlet 160. Also, similar to the embodiments of FIGS. 1 and 2, a backpressure can be selectively imposed on exhaust outlet 160 by, for example, a flow-restricting variable valve 170. The backpressure raises the dew point of the exhaust stream (because the saturation volumetric concentration of water in air decreases with increasing air pressure), thus making the water in the exhaust more easily recoverable in high-ambient temperature environments.

It will be understood that the condensing radiator 154 or other water recovery apparatus may not be necessary in all systems, such as stationary power systems, or in other applications where water recovery is not needed or desirable.

The invention has significant advantages over a conventional non-hybridized hydrogen fuel cell system. The net power output is increased at constant fuel cell size by virtue of recapturing some of the low-quality waste heat of the stack as mechanical or electrical power. Moreover, it is easier to have a full water recycle with reasonable radiator size, because the dew point of the exhaust is raised by combusting extra hydrogen and/or other fuel(s) in the burner, and less heat needs to be rejected since some of the waste heat has been recovered. In addition, the fuel cell efficiency is higher because of the pressurization of the air stream to the cathode, while the heat recovery via the turbine will compensate for the parasitic power required to compress the air. Turbine cycle efficiency is high due to the free latent heat Rankine cycle addition.

Fourth Embodiment

Figure 4:
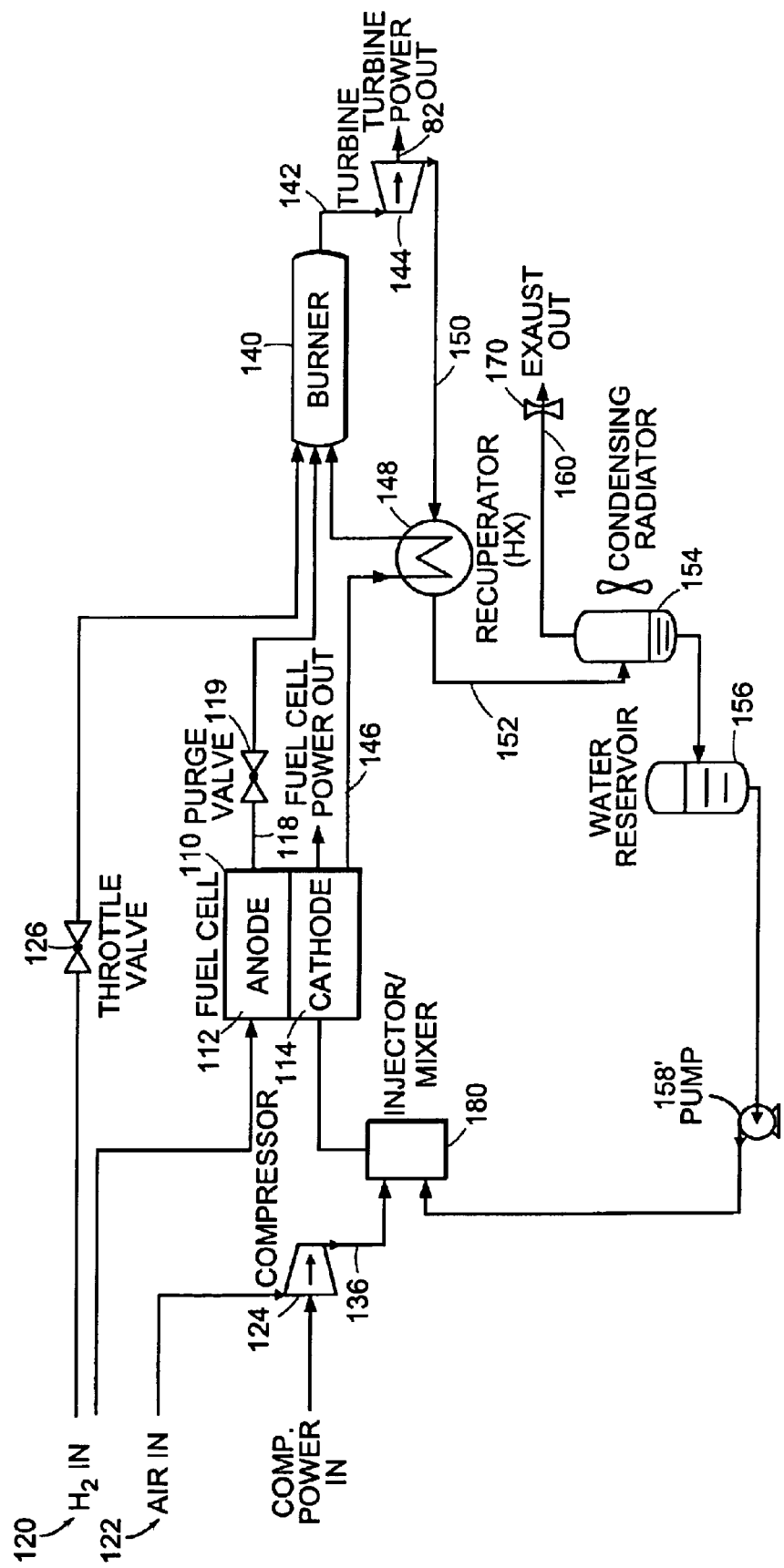
FIG. 4 is a schematic diagram of a hydrogen fuel cell power system using direct water injection.

Turning now to FIG. 4, an alternative implementation of a pure hydrogen fuel cell power system of the invention is shown, wherein water is evaporated into pressurized air via direct injection of water into the fuel cell to achieve both humidification and cooling. In this example, similar to the embodiment of FIG. 2, the cooling loop and saturator 132 of FIG. 3 have been replaced by an injector mixer 180, supplied with water from reservoir 156 by pump 158'. The injector mixes water with the pressurized air from the compressor 124, and injects the water/air mixture into the cathode 114 of the fuel cell 110. The water cools and humidifies the fuel cell, and at least a portion of the water is evaporated into the cathode air to produce the pressurized air/steam mixture 146 that is used by the burner 140. The injection/mixing can be performed in a separate apparatus 180, as shown here, or the water can be directly injected into the stack to mix with the pressurized cathode air. If necessary, additional water can be evaporated into the cathode exhaust 146, either before or within recuperator 148, using the heat from the burner exhaust. Intermediate arrangements are possible, in which a cooling loop is also provided to allow heat management under a wide variety of conditions, for example, when the burner is not being used.

Other System Components and Features

Where heat exchange is desirable or required in any of the embodiments of the invention described above, any method of heat exchange or heat transfer known or used by those skilled in the art may be suitable for the present invention. Where feasible, integration of the modules into one or more common housings is an effective way to provide efficient heat transfer. Thus, a reforming zone may be annularly disposed around or within a burner zone. In addition, heat may be transferred between zones by conventional heat exchangers, such as tubing and other hollow constructions, and by passive devices such as fins.

Also, while any type of expander is, in principle, usable in increasing system efficiency, the use of a turbine as an expander is a presently preferred in the above-described embodiments. The advantage of a turbine is that turbines are available which can operate reliably at high temperatures, such as 1200–1600 deg. F. (ca. 650–900 deg. C.), which is similar to or below the preferred temperatures for catalyzing a reforming reaction, when using fuels such as gasoline, propane or methane. For other fuels, such as methanol, reforming reaction temperatures may be lower. Operation of the expander at as high a temperature as feasible is strongly preferred to obtain maximum net mechanical work, i.e., work in excess of the work expended to compress the air at the beginning of the waste heat recapture process. A turbine has a potential disadvantage in that its efficiency is sharply peaked at a particular gas flow rate. In the system of the invention, this can be compensated for by sizing the compressed air/water heat exchange to remove approximately 40% to 50% of the excess fuel cell heat generated at maximum load. Then the compressed air flow into the system can be kept at a constant level, from about 40% of full power up to 100% power, preserving the efficiency of recovery of the waste heat. The rest of the waste heat can be removed by conventional heat exchange methods.

Alternatively, additional injection of water into the air/steam line after the fuel cell and before injection into the burner, including especially water used for fuel cell cooling or otherwise heated while performing heat exchange, allows additional capture of low-temperature energy, while maintaining volumetric flow in an appropriate range for the expander. Moreover, if the full preferred air flow would produce drying in a fuel cell, such as a PEM fuel cell, then a portion of the compressed air or air/steam can bypass the fuel cell and join the cathode exhaust beyond the fuel cell for heating.

The requirement for high temperature controls the location of the expander in the system. The temperature at the expander should be as high as feasible for maximum efficiency. With conventional metal turbines, this is in the range of about 1000 to 1600 deg. F. (ca. 450–900 deg. C.), with 1300 to 1500 deg. F. (ca. 720–850 deg. C.) being preferred. This implies that the turbine cannot be exposed directly to the exhaust, which is typically about 1800 to 2000 deg. F. (ca. 1000–1150 deg. C.). Therefore, the exhaust is preferably first used to heat a reformer, when one is present (as in Embodiments 1 and 2, described above), and then expanded in the turbine. This is also preferable for maximizing the temperature of the reforming reaction. However, with a fuel which is unstable and easy to reform at lower temperatures, such as methanol, then it might be preferable to use an expander capable of operating at higher temperatures in the range of about 1600 deg. F. up to 2000 deg. F. (ca. 850–1150 deg. C.), such as a ceramic turbine, and to locate it as the first component downstream of the burner. Then the cooler gas could be used to heat the reformer. Although less available, other high temperature-tolerant expanders, particularly positive pressure expanders, may be used in the invention for recovering the energy of the heated air/steam mixture in the burner exhaust.

An alternative way of providing hydrogen without having a reformer is the direct oxidation of fuels in the anode. Methanol is particularly suited for such an application, although other alcohols may be used. (See, for example, U.S. Pat. No. 6,423,203 for a description of such uses.) These "reformerless" fuel cells can benefit in efficiency by the systems described above for "pure" hydrogen-fueled fuel cells. There will be less waste heat available, to the extent that some of the waste heat is consumed in the in-site reformation of the fuel on the anode. However, the conversion is in many cases less efficient than in a hydrogen or reformate supplied fuel cell, so that the anode exhaust may supply a higher proportion of the fuel supply required for the burner. It may also supply some evaporated water, to the extent that the fuel may contain some water or, if pre-vaporized, water vapor. In such a case, the "direct" fuel cell can be considered to be its own hydrogen source, and thus to fall within the limits of the invention when such embodiments provide improved efficiencies that can be realized sufficiently to recover the extra costs of the burner and expander.

While this invention has been particularly shown and described with references to preferred embodiments thereof, it will be understood by those skilled in the art that various changes in form and details may be made therein without departing from the scope of the invention encompassed by the appended claims.

What is claimed is:

1. A fuel cell power system comprising:

a fuel cell comprising an anode and a cathode;

a source of hydrogen gas, the hydrogen gas being provided to the anode of the fuel cell;

a compressor for creating a pressurized air stream, the pressurized air stream being provided to the cathode of the fuel cell, the pressurized air stream of the cathode and the hydrogen gas of the anode reacting at the fuel cell membrane to produce an electrical power output and waste heat;

a liquid supply in fluid communication with the pressurized air stream, at least a portion of the liquid from the supply being heated by waste heat from the power system and evaporating into the pressurized air stream to produce a pressurized mixture of air and steam;

a burner which combusts a fuel with the pressurized air/steam mixture to produce a steam-containing exhaust stream;

an expander in fluid communication with the burner, the expander being driven by the steam-containing exhaust stream to produce a power output in excess of the power required to pressurize the air; and a power take-off of the excess power from the expander.

2. The system of claim 1, wherein the power take-off is used to drive an electrical generator.

3. The system of claim 1, wherein the power take-off is used to drive at least one component of the power system.

4. The system of claim 3, wherein the at least one component of the system comprises at least one of a compressor and a pump.

5. The system of claim 1, wherein the expander comprises a turbine.

6. The system of claim 1, wherein the source of hydrogen comprises a fuel reformer.

7. The system of claim 6, wherein the burner provides heat for a fuel reforming reaction.

8. The system of claim 1, wherein the source of hydrogen comprises a fuel which is at least partially reformed to produce hydrogen directly at or near a membrane of the fuel cell.

9. The system of claim 1, wherein the fuel cell comprises a non-hybridized hydrogen fuel cell.

10. The system of claim 9, wherein the source of hydrogen comprises a source of stored hydrogen.

11. The system of claim 9, wherein the fuel combusted by the burner comprises unreacted hydrogen gas from the anode.

12. The system of claim 11, further comprising a purge valve for selectively providing the burner with exhaust from the anode of the fuel cell.

13. The system of claim 9, wherein fuel combusted by the burner comprises fuel from a source other than the anode of the fuel cell.

14. The system of claim 13, wherein the additional fuel comprises hydrogen, and the source comprises the source of hydrogen gas.

15. The system of claim 14, further comprising a throttle valve for selectively providing the burner with hydrogen gas from the source.

16. The system of claim 9, further comprising a heat exchanger for transferring heat from the burner exhaust to at least one fluid.

17. The system of claim 16, wherein the fluid comprises a burner input.

18. The system of claim 16, wherein the heat exchanger transfers heat from the burner exhaust after the exhaust has passed through the expander.

19. The system of claim 16, wherein the heat exchanger transfers heat from the burner exhaust before the exhaust has passed through the expander.

20. The system of claim 1, further comprising a condensing radiator for recovering steam from the burner exhaust prior to discharging the exhaust from the system.

21. The system of claim 20, further comprising an apparatus for selectively applying a backpressure to the burner exhaust to facilitate recovery of steam in the burner exhaust.

22. The system of claim 1, further comprising a cooling fluid circulating through the system for removing waste heat from the fuel cell.

23. The system of claim 22, wherein the source of liquid evaporated into the pressurized air comprises cooling fluid.

24. The system of claim 22, wherein the source of liquid evaporated into the pressurized air is heated by waste heat from the cooling fluid.

25. The system of claim 1, wherein the liquid from the supply is injected into the fuel cell.

26. The system of claim 25, wherein the liquid is evaporated into the pressurized air stream within the fuel cell.

27. The system of claim 1, wherein the fuel cell has an operating temperature of less than about 200° C.

28. The system of claim 1, wherein the fuel cell is a PEM fuel cell.

29. A method for efficient operation of a fuel cell power system comprising:
providing hydrogen gas from a source to an anode of a fuel cell;
compressing oxygen-containing gas to produce a pressurized air stream;
providing the pressurized air to a cathode of a fuel cell;
reacting the hydrogen gas and the pressurized air at the fuel cell to produce an electrical power output and waste heat;
evaporating a liquid into the pressurized air stream, using waste heat from the power system, to produce a pressurized air/steam mixture;
burning a fuel with the pressurized air/steam mixture to produce a high-temperature steam-containing exhaust stream; and
expanding the high-temperature steam-containing exhaust stream through an expander to produce a power output in excess of the power required to provide the pressurized air stream; and
taking-off excess power from the expander.

30. The method of claim 29, wherein taking-off excess power comprises using the power to drive an electrical generator.

31. The method of claim 29, wherein taking-off excess power comprises driving a component of the power system.

32. The method of claim 31, wherein the component comprises at least one of a pump and a compressor.

33. The method of claim 29, wherein the expander comprises a turbine.

34. The method of claim 29, wherein the step of evaporating liquid into pressurized air occurs before the air stream enters the fuel cell.

35. The method of claim 29, wherein the step of evaporating liquid into pressurized air occurs within the fuel cell.

36. The method of claim 29, further comprising circulating a cooling fluid within the system to remove waste heat from the fuel cell, and using waste heat from the circulating cooling fluid to evaporate liquid into pressurized air.

37. The method of claim 36, wherein the liquid evaporated into pressurized air comprises circulating cooling fluid.

38. The method of claim 29, further comprising injecting a liquid into the fuel cell, and evaporating the liquid into pressurized air within the fuel cell.

39. The method of claim 29, wherein the fuel cell has an operating temperature of about 200° C. or less.

40. The method of claim 29, wherein the fuel cell is a PEM fuel cell.

41. The method of claim 29, wherein the system comprises a hybridized fuel cell power system, and wherein the source of hydrogen is a fuel reformer.

42. The method of claim 29, wherein the source of hydrogen comprises a fuel which is at least partially reformed to produce hydrogen directly at or near a membrane of the fuel cell.

43. The method of claim 29, wherein the system comprises a non-hybridized hydrogen fuel cell power system.

44. The method of claim 43, wherein the source of hydrogen comprises a source of stored hydrogen.

45. The method of claim 43, further comprising:
discharging exhaust from the anode of the fuel cell, the exhaust including unreacted hydrogen; and
combusting the unreacted hydrogen with the pressurized air/steam mixture to produce the high-temperature steam-containing exhaust stream.

46. The method of claim 43, wherein the fuel combusted with the pressurized air/steam mixture comprises fuel from a source other than the anode of the fuel cell.

47. The method of claim 46, wherein the fuel comprises hydrogen, and the source comprises the source of hydrogen gas.

48. The method of claim 43, further comprising pre-heating at least one of the fuel and the pressurized air/steam mixture prior to combustion.

49. The method of claim 48, wherein the step of pre-heating comprises providing heat from the high-temperature steam-containing exhaust stream.

50. The method of claim 29, further comprising recovering condensed steam from the exhaust stream prior to discharging the exhaust from the system.

51. The method of claim 50, further comprising selectively applying a backpressure to the exhaust stream to facilitate recovery of condensed steam from the exhaust.

52. A non-hybridized hydrogen fuel cell power system comprising:

a fuel cell comprising an anode and a cathode;

a source of hydrogen gas, the hydrogen gas being provided to the anode of the fuel cell, the hydrogen not being provided by a separate local fuel reforming unit;

a compressor for creating a pressurized air stream, the pressurized air stream being provided to the cathode of the fuel cell, the pressurized air stream of the cathode and the hydrogen gas of the anode reacting at the fuel cell membrane to produce an electrical power output and waste heat;

a liquid supply in fluid communication with the pressurized air stream, at least a portion of the liquid from the supply being heated by waste heat from the power system and evaporating into the pressurized air stream to produce a pressurized mixture of air and steam;

a burner which combusts a fuel with the pressurized air/steam mixture to produce a steam-containing exhaust stream; and an expander in fluid communication with the burner, the expander being driven by the steam-containing exhaust stream to produce a power output.

53. The system of claim 52, wherein the source of hydrogen gas comprises a source of stored hydrogen.

54. The system of claim 52, wherein the source of hydrogen gas comprises a fuel that is converted to hydrogen directly at or near a fuel cell membrane.

55. A method for efficient operation of a non-hybridized hydrogen fuel cell power system comprising:

providing hydrogen gas from a source to an anode of a fuel cell, the hydrogen not being provided by a separate local fuel reforming unit;

compressing oxygen-containing gas to produce a pressurized air stream;

providing the pressurized air to a cathode of a fuel cell;

reacting the hydrogen gas and the pressurized air at the fuel cell to produce an electrical power output and waste heat;

evaporating a liquid into the pressurized air stream, using waste heat from the power system, to produce a pressurized air/steam mixture;

burning a fuel with the pressurized air/steam mixture to produce a high-temperature steam-containing exhaust stream; and expanding the high-temperature steam-containing exhaust stream through an expander to produce a power output.

56. A fuel cell power system comprising:

a fuel cell comprising an anode and a cathode;

a source of hydrogen gas, the hydrogen gas being provided to the anode of the fuel cell;

a compressor for creating a pressurized air stream, the pressurized air stream being provided to the cathode of the fuel cell, the pressurized air stream of the cathode and the hydrogen gas of the anode reacting at the fuel cell membrane to produce an electrical power output and waste heat;

a liquid supply in fluid communication with the pressurized air stream, at least a portion of the liquid from the supply being heated by waste heat from the power system and evaporating into the pressurized air stream to produce a pressurized mixture of air and steam;

a burner which combusts a fuel with the pressurized air/steam mixture to produce a steam-containing exhaust stream;

an expander in fluid communication with the burner, the expander being driven by the steam-containing exhaust stream to produce a power output;

a condensing apparatus for recovering steam from the burner exhaust prior to discharging the exhaust from the system; and an apparatus for selectively applying a backpressure to the burner exhaust to facilitate recovery of steam from the burner exhaust.

57. A method for efficient operation of a fuel cell power system, comprising:

providing hydrogen gas from a source to an anode of a fuel cell;

compressing oxygen-containing gas to produce a pressurized air stream;

providing the pressurized air to a cathode of a fuel cell;

reacting the hydrogen gas and the pressurized air at the fuel cell to produce an electrical power output and waste heat;

evaporating a liquid into the pressurized air stream, using waste heat from the power system, to produce a pressurized air/steam mixture;

burning a fuel with the pressurized air/steam mixture to produce a high-temperature steam-containing exhaust stream;

expanding the high-temperature steam-containing exhaust stream through an expander to produce a power output;

recovering condensed steam from the exhaust prior to discharging the exhaust to the environment; and selectively applying a backpressure to the exhaust stream to facilitate recovery of condensed steam from the exhaust.

* * * * *